Patented Dec. 20, 1927.

1,653,519

UNITED STATES PATENT OFFICE.

JOHN K. SPEICHER, OF KENVIL, NEW JERSEY, ASSIGNOR TO HERCULES POWDER COMPANY, OF WILMINGTON, DELAWARE, A CORPORATION OF DELAWARE.

METHOD OF OBTAINING NITROCELLULOSE FROM SMOKELESS POWDER.

No Drawing.     Application filed February 4, 1927. Serial No. 166,015.

My invention relates to a method for the removal of diphenylamine from smokeless powder for the recovery of nitrocellulose.

Smokeless powder has heretofore been widely used in the manufacture of low viscosity lacquer, the powder being usually prepared for such use by first grinding the powder grains and then digesting in water at elevated temperatures, for example, those corresponding to steam at say between 20 pounds and 40 pounds pressure, for several hours. After digestion the powder is bleached to remove the yellow color formed in the digesting process, and dissolved in suitable nitrocellulose solvents.

It has been heretofore known that in order to permit of using the powder in lacquers, it is necessary to remove from the powder the diphenylamine, or other stabilizers as Centralites, substituted ureas, urethanes, etc., incorporated therewith, since the diphenylamine or other stabilizer if left in powder exerts a detrimental effect on lacquer.

Numerous methods have heretofore been provided for removing diphenylamine. For example, in one case the removal of the diphenylamine is effected by the use of ethyl alcohol and hydrochloric acid, and in another the removal is effected by a mixture of liquids, practically non-solvent of the powder, and an alkali.

Now, the process in accordance with my invention, comprises broadly the removal of the diphenylamine from smokeless powder by treatment of the smokeless powder in solution in a suitable solvent with a non-solvent of the smokeless powder which will extract the diphenylamine and precipitate the smokeless powder, or what is essentially nitrocellulose, substantially free from diphenylamine, or free from diphenylamine to an extent enabling any remaining traces thereof to be removed by washing with a suitable non-solvent of the nitrocellulose.

The method involving my invention, and which will be herein described in detail, is capable of substantial variation and may, as will be noted, be carried out either as a batch method or as a continuous method and will result in the production of a nitrocellulose free from diphenylamine, and in the form of a stable matted material, white in color, which will readily dissolve in the usual solvents, having no trace of hollow fibres and of a slightly lower nitrogen content and lower viscosity than the original powder, thus lending itself to a peculiarly high degree to the production of lacquers, nitrocellulose solutions, etc.

In carrying out the method involving my invention, if it is to be practiced as a batch method, for example, smokeless powder, without grinding or other preparation involving expense, is dissolved in a suitable solvent in any convenient proportion. As the solvent for the smokeless powder, I may use, for example, acetone; ethyl acetate, methyl acetate, amyl acetate, etc., etc., or in fact, any solvent of the smokeless powder. As an example of a smokeless powder solution I have found that a 10% solution of smokeless powder, by weight, in acetone will give very satisfactory results.

The solution of smokeless powder is treated, for example, in any convenient manner with a non-solvent of the smokeless powder to precipitate the nitrocellulose. The smokeless powder solution may, for example, be run into a body of the non-solvent in a fine stream and the non-solvent is preferably agitated while the solution is run in. The non-solvent may be, for example, alcohol, xylol, toluol, gasoline, etc., etc., or in fact any non-solvent of the smokeless powder which will effect precipitation of the nitrocellulose substantially free from diphenylamine.

In selecting the solvent and non-solvent for use in carrying out the process in accordance with my invention, it is preferable according to one way of carrying out my invention, though not essential, that a solvent and non-solvent of different boiling points be selected and that the non-solvent be of higher boiling point than the solvent, preferably, though not necessarily, of substantially higher boiling point. In certain instances it may be advantageous in selecting the solvent and non-solvent to select such that, although the boiling point of the non-solvent is not higher than that of the solvent, due to the formation of an azeo-tropic mixture the vapors given off on boiling are composed principally of solvent, the liquid remaining behind being principally non-solvent.

In the treatment of the smokeless powder solution with the non-solvent, the non-solvent, assuming a non-solvent of higher boiling point than the solvent is selected, is preferably, though not necessarily, heated to a temperature above the boiling point of the solvent used for forming the smokeless powder solution and below that of the non-solvent. For example, if acetone is used as the solvent and toluol as the non-solvent, the toluol may be maintained advantageously at a temperature of about 100° to 110° C. On introducing the smokeless powder solution into a heated body of the non-solvent, for example, in a thin stream, the non-solvent acts to precipitate nitrocellulose substantially free from diphenylamine, which is retained by the non-solvent. The heat acts to vaporize the solvent, which may be recovered for reuse. The precipitated nitrocellulose is removed from the non-solvent and preferably washed in a fresh supply of non-solvent to remove any remaining traces of diphenylamine.

The same supply of non-solvent, especially when heat has been applied and the solvent vaporized off, may be used repeatedly, until it becomes highly charged with diphenylamine, which goes into solution therein. The non-solvent may be prepared for reuse by elimination of the diphenylamine by distillation, or when the non-solvent is a hydrocarbon, as xylol or toluol, etc., the diphenylamine may be eliminated by washing with, for example, sulphuric acid. The solvent vaporized by the heating of the non-solvent and such of the non-solvent as is entrained with the vapors of the solvent may be recovered by condensation.

If it be desired to carry out the method as a continuous one such may be effected, for example, when the solvent selected is of lower boiling point than the non-solvent, by forming a mixture of the solvent and non-solvent, for example, acetone and toluol, and distilling off vapors of the solvent. The vapors of the solvent are condensed and the condensate, or liquid solvent, conducted into a vessel holding smokeless powder. The solvent acts to dissolve the smokeless powder and the solution is allowed to overflow into the mixture of solvent and non-solvent, which as such is non-solvent of the powder and which acts to precipitate the nitrocellulose, and from which the nitrocellulose is removed periodically for use, or final washing. The carrying on of the method continuously may be accomplished in any suitable apparatus.

In carrying out the method involving my invention a solvent and non-solvent forming a minimum boiling point mixture may be selected. In this case the azeotropic mixture should be an effective solvent. When the solvent and non-solvent are heated, the vapors given off and condensed approach the composition of the azeotropic mixture, the condensate is run into a mass of smokeless powder which is dissolved by the condensate and the solution permitted to overflow into the boiling mixture which is essentially non-solvent and precipitates the nitrocellulose free from diphenylamine.

As an example of an azeotropic mixture which may be used in carrying out my invention, 23% by weight of isopropyl alcohol boiling at 82.45° C. is mixed with 77% by weight of ethyl acetate, boiling at 77.05° C. The mixture will boil at 74.8° C. and is a so called minimum boiling point mixture the vapors from which when condensed form a solvent of the smokeless powder. Therefore, if isopropyl alcohol containing a small amount of ethyl acetate is heated to boiling, the vapors given off will approach the above constant boiling mixture in composition and may when condensed be used to dissolve smokeless powder, the nitrocellulose being precipitated by returning the solution into the boiling mixture.

As further examples of azeotropic mixture which may be used in carrying out my invention, a mixture may comprise 8.4% ethyl alcohol, boiling at 78.3° C., 9.0% water boiling at 100° C. and 82.6% ethyl acetate, boiling at 77.05° C. The mixture will boil at 70.23° C. is a so called minimum boiling point mixture and an effective solvent, the vapors from which will on condensation provide an effective solent for the smokeless powder. Another mixture may comprise 23% methyl acetate, boiling at 57.05° C. and 77% chloroform, boiling at 61.2° C. The mixture will boil at 64.8° C.

In connection with the description of the method involving my invention, it will be understood that I do not intend to limit my invention to the use of any particular solvent or non-solvent mentioned by me, it being my intention that any solvent and non-solvent, workable substitutes for those solvents and non-solvents specifically mentioned and suitable for use in carrying out my invention, shall be included within the scope of my invention; and it will be further understood that when herein I specify acetone and toluol I intend to include workable substitutes therefor; and it will be noted that while I may use a non-solvent of higher boiling point than the solvent, the solvent and non-solvent may be such regardless of their boiling points, as will form either a minimum constant boiling point mixture, which will be an effective solvent or a maximum boiling point mixture, which will be an effective non-solvent, or alternately such that where the boiling points of the solvent and non-solvent are very close together the vapors given off are composed principally of solvent due to the formation of an azeotropic mixture.

It will be understood that in carrying out the process involving my invention any suitable apparatus may be used and that the process may be carried out as a batch process or as a continuous process, with or without the use of heat and that solvents and non-solvents may be selected which have the same or different boiling points, or which will form azeotropic mixtures, without departing from the essence of my invention. It will also be understood that while it is preferable to so carry out the process as to effect ready recovery of the solvent and non-solvent used, such recovery is not essential.

It will be further understood when stabilizers other than diphenylamine, for example, Centralites, substituted ureas, urethanes, etc., are found in smokeless powder, they may be eliminated and nitrocellulose free from the stabilizer recovered according to my invention by the selection of suitable solvent and non-solvent and without departing from the spirit of my invention.

Having now fully described my invention, what I claim and desire to protect by Letters Patent is:—

1. The method of obtaining nitrocellulose from smokeless powder containing diphenylamine, which includes forming a solution of smokeless power in acetone, heating a body of toluol to the boiling point of the acetone, introducing the solution into the heated toluol and recovering nitrocellulose from the toluol.

2. The method of obtaining nitrocellulose from smokeless powder containing a stabilizer, which includes forming a mixture of a solvent for the smokeless powder and a non-solvent thereof, heating the mixture to effect vaporization therefrom, condensing vapors from the mixture, forming a solution of smokeless powder with the condensate, introducing the solution formed into the mixture while continuing the vaporization from the mixture and recovering nitrocellulose from the mixture.

3. The method of obtaining nitrocellulose from smokeless powder containing a stabilizer, which includes forming a mixture of a solvent for the smokeless powder and a non-solvent thereof having a boiling point higher than that of the solvent, heating the mixture to the boiling point of the solvent to effect vaporization of solvent therefrom, condensing the vapors, forming a solution of smokeless powder with the condensate, introducing the solution formed into the mixture while continuing to vaporize solvent therefrom and recovering nitrocellulose from the mixture.

4. The method of obtaining nitrocellulose from smokeless powder, which includes mixing a solvent for the smokeless powder and a non-solvent thereof in proportions such that the mixture is a non-solvent and the vapors given off therefrom on boiling will on condensation produce a solvent for smokeless powder, heating the mixture to its boiling point, condensing the vapors from the mixture, forming a solution of smokeless powder with the condensate, and introducing the solution formed into the mixture and recovering nitrocellulose from the mixture.

5. The method of obtaining nitrocellulose from smokeless powder containing diphenylamine, which includes forming a mixture of acetone and toluol, vaporizing acetone from the mixture, condensing the vapors of acetone, forming a solution of smokeless powder with the condensate, introducing the solution formed into the mixture, while continuing to vaporize acetone therefrom and recovering nitrocellulose from the mixture.

6. The method of removing a stabilizer from smokeless powder which includes forming a solution of smokeless powder in a solvent therefor, treating the solution with a substance having the capacity to precipitate nitrocellulose and extract the stabilizer from the solution and recovering the precipitated nitrocellulose.

7. The method of removing diphenylamine from smokeless powder which includes forming a solution of about 10% by weight of smokeless powder in acetone, introducing the solution into a body of toluol, while heating the toluol to a temperature of not less than about 100° C., recovering the precipitated nitrocellulose and washing the recovered nitrocellulose with toluol.

In testimony of which invention, I have hereunto set my hand, at Kenvil, N. J., on this 2nd day of February, 1927.

JOHN K. SPEICHER.

CERTIFICATE OF CORRECTION.

Patent No. 1,653,519. Granted December 20, 1927, to

JOHN K. SPEICHER.

It is hereby certified that error appears in the printed specification of the above numbered patent requiring correction as follows: Page 3, line 25, claim 1, for the word "power" read "powder"; and that the said Letters Patent should be read with this correction therein that the same may conform to the record of the case in the Patent Office.

Signed and sealed this 31st day of January, A. D. 1928.

M. J. Moore,
Seal. Acting Commissioner of Patents.